(12) United States Patent
Litke et al.

(10) Patent No.: US 9,946,480 B2
(45) Date of Patent: Apr. 17, 2018

(54) DISK IMAGE DELETION WITH FAILURE RESISTANT DATA ERASURE

(71) Applicant: Red Hat Israel, Ltd., Raanana (IL)

(72) Inventors: Adam Gerard Litke, Bethel Park, PA (US); Nir Soffer, Raanana (IL); Liron Aravot, Ramat Gan (IL)

(73) Assignee: Red Hat Israel, Ltd., Raanana (IL)

( * ) Notice: Subject to any disclaimer, the term of this patent is extended or adjusted under 35 U.S.C. 154(b) by 167 days.

(21) Appl. No.: 15/138,515

(22) Filed: Apr. 26, 2016

(65) Prior Publication Data

US 2017/0308312 A1    Oct. 26, 2017

(51) Int. Cl.
*G06F 11/00* (2006.01)
*G06F 3/06* (2006.01)
*G06F 11/07* (2006.01)

(52) U.S. Cl.
CPC .......... *G06F 3/0623* (2013.01); *G06F 3/0652* (2013.01); *G06F 3/0659* (2013.01); *G06F 3/0673* (2013.01); *G06F 11/073* (2013.01); *G06F 11/079* (2013.01); *G06F 11/0751* (2013.01); *G06F 11/0793* (2013.01)

(58) Field of Classification Search
CPC .... G06F 3/0622; G06F 3/0623; G06F 3/0631; G06F 3/0637; G06F 3/0652; G06F 11/073; G06F 11/0751; G06F 2221/2143
See application file for complete search history.

(56) References Cited

U.S. PATENT DOCUMENTS

| 9,678,681 B2* | 6/2017 | Goldberg | G06F 3/0619 |
| 2010/0174865 A1* | 7/2010 | Koester | G06F 21/80 |
| | | | 711/114 |
| 2015/0261561 A1* | 9/2015 | Ashok | G06F 9/45558 |
| | | | 718/1 |
| 2016/0335004 A1* | 11/2016 | Jones | G06F 3/0619 |

\* cited by examiner

*Primary Examiner* — Marc Duncan
(74) *Attorney, Agent, or Firm* — Lowenstein Sandler LLP

(57) ABSTRACT

Systems and methods for disk image deletion with failure resistant data erasure. An example method may comprise: receiving a request to delete a first disk image associated with a data storage portion; associating the data storage portion with a second disk image responsive to receiving the request to delete the first disk image; deleting the first disk image; and initiating a data erasure procedure on the data storage portion.

20 Claims, 5 Drawing Sheets

US 9,946,480 B2

DISK IMAGE DELETION WITH FAILURE RESISTANT DATA ERASURE

TECHNICAL FIELD

The present disclosure is generally related to data storage management, and is more specifically related to erasing or wiping portions of data storage associated with a deleted data object.

BACKGROUND

Computing environments often include storage management functionality for managing the release and reuse of data storage. The storage management functionality may be responsible for determining when data storage can be reused by another computing process or computing device. When deleting disks, the storage is released so that it is available for reuse but the data on the storage may still be present. This may enable a computing process or computing device that is subsequently assigned the storage to access the data on the storage.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
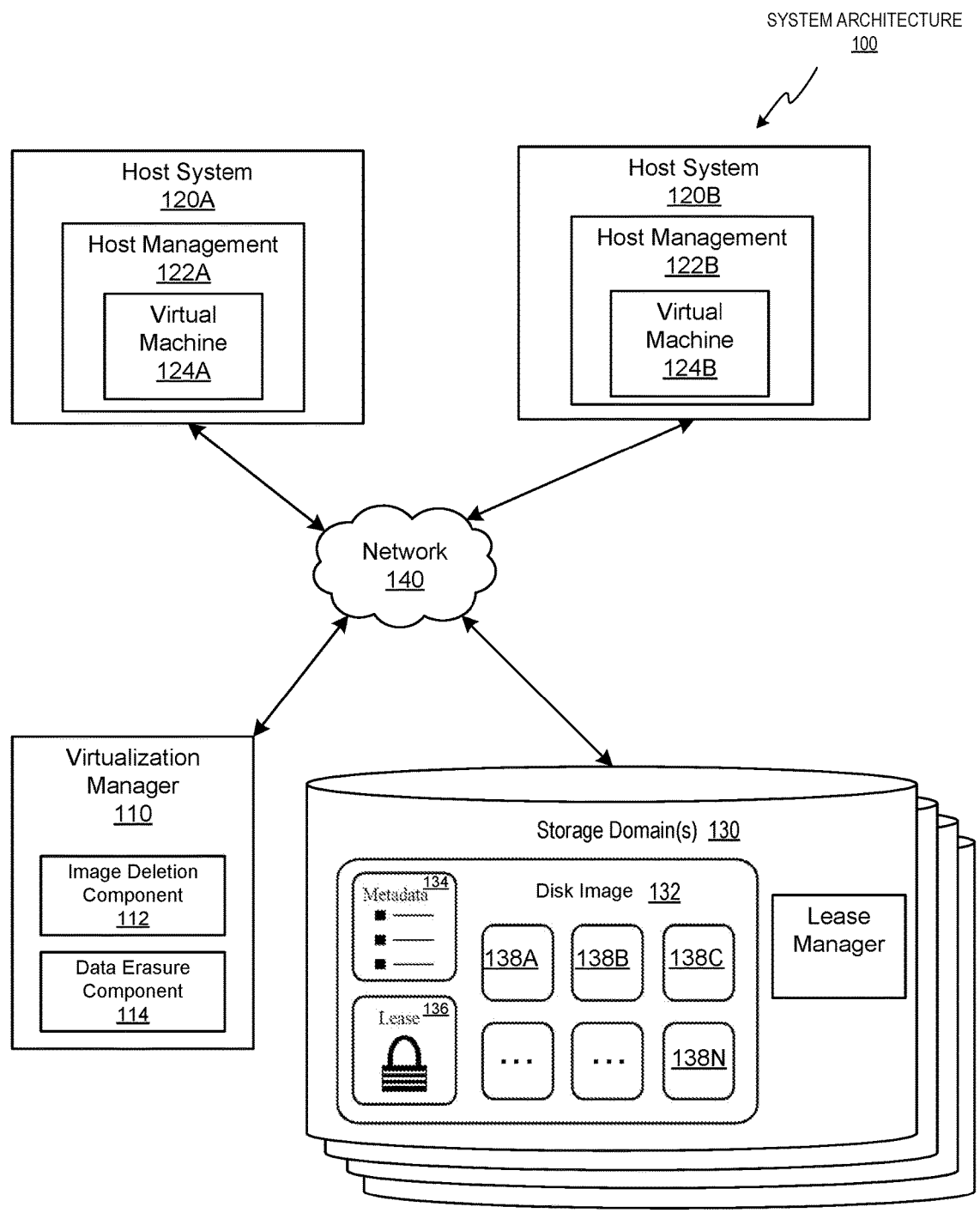
FIG. 1 depicts a high-level diagram of an example system architecture operating in accordance with one or more aspects of the present disclosure.

Described herein are methods and systems for data storage management technology that performs data erasure for deleted disk images in a manner that may enable reuse of disk images in a security-enhanced manner. Computing environments may store a variety of disk images that may store data of a virtual machine. The disk images may occupy storage space that is managed by a storage manager. The storage manager may provide mechanisms that delete disk images and enable the deleted disk image storage to be reused to enhance performance. The deletion of a disk image often involves releasing data storage associated with the disk image so that the data storage may be used by another computing process. Releasing the data storage may involve marking the data storage as available for use but may not clear the data within the data storage. This may present a privacy concern or security vulnerability because a subsequent computing process may be assigned a portion of the same data storage and may be able to access the data within the data storage.

The security vulnerability may be reduced by erasing the data storage associated with the disk image. Erasing data storage may occur at different points in time depending on the method of reuse. A first method may involve erasing the data storage of the disk image prior to deleting the disk image. This may not be optimal because the process of erasing data (e.g., overwriting data) may be time consuming and may delay reuse. A second method may involve deleting the disk image first and then erasing the data storage associated with the disk image in the background. This may avoid delayed reuse of the disk image but may not account for failures that may occur during an erasure procedure. For example, if a failure occurs prior to the data storage erasure completing, then the system may recover and a garbage collector may release the data storage prior to the erasure procedure completing and therefore the data storage may be reused without being erased.

The technology discussed herein may be advantageous because in one example it may perform an erasure procedure on data storage for a disk image after the disk image has been deleted. This may enhance data privacy while reducing the delay in reusing the disk image (e.g., reuse of the disk image identifier). The technology may be performed by a storage management system that manages one or more disk images. In one example, the storage management system may be included within a virtualization manager and each disk image may be a virtual disk image that is associated with one or more data storage portions (e.g., storage volumes). Each data storage portion may correspond to a state of a virtual machine at a point in time. When deleting a disk image, the storage manager may generate a second disk image (e.g., temporary disk image) and associate the data storage portions associated with the first disk image with the second disk image. The first disk image may be deleted before, during, or after a data erasure procedure is performed. The data erasure procedure may involve erasing (e.g., overwriting, clearing, wiping) data from the data storage portions that were associated with the first disk image after the data storage portions are associated with the second disk image. If a failure occurs prior to the completion of the erasure, the second disk image may be accessed and the erasure procedure may be re-initiated to avoid the concern that a garbage collector would remove the second disk image before erasure is completed, as it may for the first disk image.

FIG. 1 illustrates an example system architecture 100 in which implementations of the disclosure may operate. The system architecture 100 may include a virtualization manager 110, a plurality of host systems 120A and 120B, and one or more storage domains 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Virtualization manager 110 may be hosted by a computer system (described in more details herein below with references to FIG. 5) and include one or more computer programs executed by the computer system for centralized management of the system architecture 100. In one implementation, the virtualization manager 110 may comprise various interfaces, including administrative interface, reporting interface, and/or application programming interface (API) to communicate with host systems 120A and 120B of system architecture 100, as well as to user portals, databases, directory servers and various other components, which are omitted from FIG. 1 for clarity.

Virtualization manager 110 may include storage management functionality that manages the storage occupied by disk images 132. In one example, virtualization manager 110 may include an image deletion component 112 and a data erasure component 114. Image deletion component 112 may enhance the deletion of a disk image by creating a temporary disk image that is associated with the data storage portion of the first disk image. The first disk image may then be deleted before, during, or after the data storage portion is erased. Data erasure component 114 may handle how the data is erased, which may involve overwriting the data with other data or by clearing the data to another state (e.g., resetting). Data erasure component 114 may also account for failures (e.g., system failures) and may ensure that the erasure has completed after recovering from a failure. Components 112 and 114 may interact with one or more host systems 120A and 120B and one or more storage domains 130 to manage the storage occupied by disk images 132. The functions described herein may be performed by virtualization manager 110 or may be initiated by virtualization manager 110 and be performed by another device, such as one of the hosts or a device of the storage domain.

Each of the host systems 120A and 120B may comprise one or more processors communicatively coupled to memory devices and input/output (I/O) devices, as described in more details herein below with references to FIG. 5. Each of the host systems 120A and 120B may run a plurality of virtual machines 124A and 124B by executing a hypervisor (not shown) to abstract the physical layer, including processors, memory, and I/O devices, and present this abstraction to the virtual machines as virtual devices. The virtual machines 124A and 124B may execute a guest operating system that may utilize the underlying virtual devices, including virtual processors, virtual memory, and virtual I/O devices. One or more applications may be running on a virtual machine under the guest operating system. Each host system 120A, 120B may run a host management module 122A, 122B that manages and monitors various aspects of the host operation, including the storage, memory and network interfaces. In an illustrative example, host management modules 122A and 122B may be provided by a Virtual Desktop and Server Management (VDSM) daemon (not shown).

In certain implementations, host systems 120A and 120B may be grouped into one or more logical groups that may be also referred to as a "data center" or "cluster". A data center may represent the highest level of abstraction in a virtualization model. Each data center may be communicatively coupled, via the network 140, to one or more storage domains 130 storing disk images 132 for machines, such as virtual machines 124A and 124B.

The storage domains 130 are employed for storing one or more disk images 132, metadata 134 and lease area 136. Storage domains 130 may provide shared access to data storage space and may include block-based storage devices, file-based storage devices, or a combination thereof. Block-based storage devices may include one or more data storage devices (e.g., Storage Area Network (SAN) devices) and provide access to consolidated block-based (e.g., block-level) data storage. Block-based storage devices may be accessible over a network and may appear to an operating system of a host system as locally attached storage. File-based storage devices may include one or more data storage devices (e.g., Network Attached Storage (NAS) devices) and provide access to consolidated file-based (e.g., file-level) data storage that may be accessible over a network. In one example, storage domain 130 may employ block-based storage and disk images 132, domain metadata 134, and domain lease 136 that are provided by respective logical volumes. In another example, storage domain 130 may employ file-based storage and disk images 132, domain metadata 134, and domain lease 136 that are provided by one or more respective files.

Each disk image 132 (also referred to as a virtual disk image) may comprise one or more data storage portions 138A-N, as schematically illustrated by FIG. 1, for storing disk image data. In an example, each of the data storage portions may be a volume of persistent data storage and the disk image may represent a chain of volumes comprising one or more copy-on-write (COW) volumes (which may also be referred to as "layers"). From the perspective of a virtual machine, these volumes may appear as a single disk image, as the hypervisor presents the virtual disk to a virtual machine and implements the associated disk read-write operations. Initially, a virtual machine disk image may comprise one raw or COW volume, which may be made read-only before the first boot of the virtual machine. An attempt to write to a disk by a virtual machine may trigger adding a new COW volume ("layer") to the volume chain. The newly created volume may be made writable, and may store disk blocks or files which have been modified or newly created by the virtual machine after the previous volume ("layer") has been made read-only. One or more volumes may be added to the volume chain during the lifetime of the virtual machine. In some implementations, making the previous volume read-only (e.g., responsive to receiving a command via an administrative interface) triggers adding of a new COW volume. The virtual disk device implemented by the hypervisor locates the data by accessing, transparently to the virtual machine, each volume of the chain of volumes, starting from the most recently added volume.

Metadata 134 of the storage domains 130 may be employed for storing references to associated volumes (e.g., to parent or child volumes in a copy-on-write chain) and/or other information that may be utilized for volume identification, management, creation, modification, removal, and/or for performing data modification operations (e.g., file operations) with respect to the data stored on the volumes 138A-N in the storage domain 130.

The lease area 136 of the storage domains 130 may be employed for storing the information that may be utilized for managing access to the data storage portions 138A-N in the storage domain 130. In certain implementations, each of the shared storage domains 130 may provide a centralized locking facility (e.g., lease manager) to prevent conflicting access by host systems 120A and 120B. By obtaining a lease from the lease manager with respect to the storage domain 130, a host system may receive exclusive access to the storage domain that would prevent other hosts from accessing the storage domain while the lease is active. A lease may have a certain expiration period and may be extended by the requestor. Failure to timely extend a lease may lead to the expiration of the lease. The state of the current lease with respect to a given storage domain may be stored in the lease area 136 of the storage domain.

Figure 2:
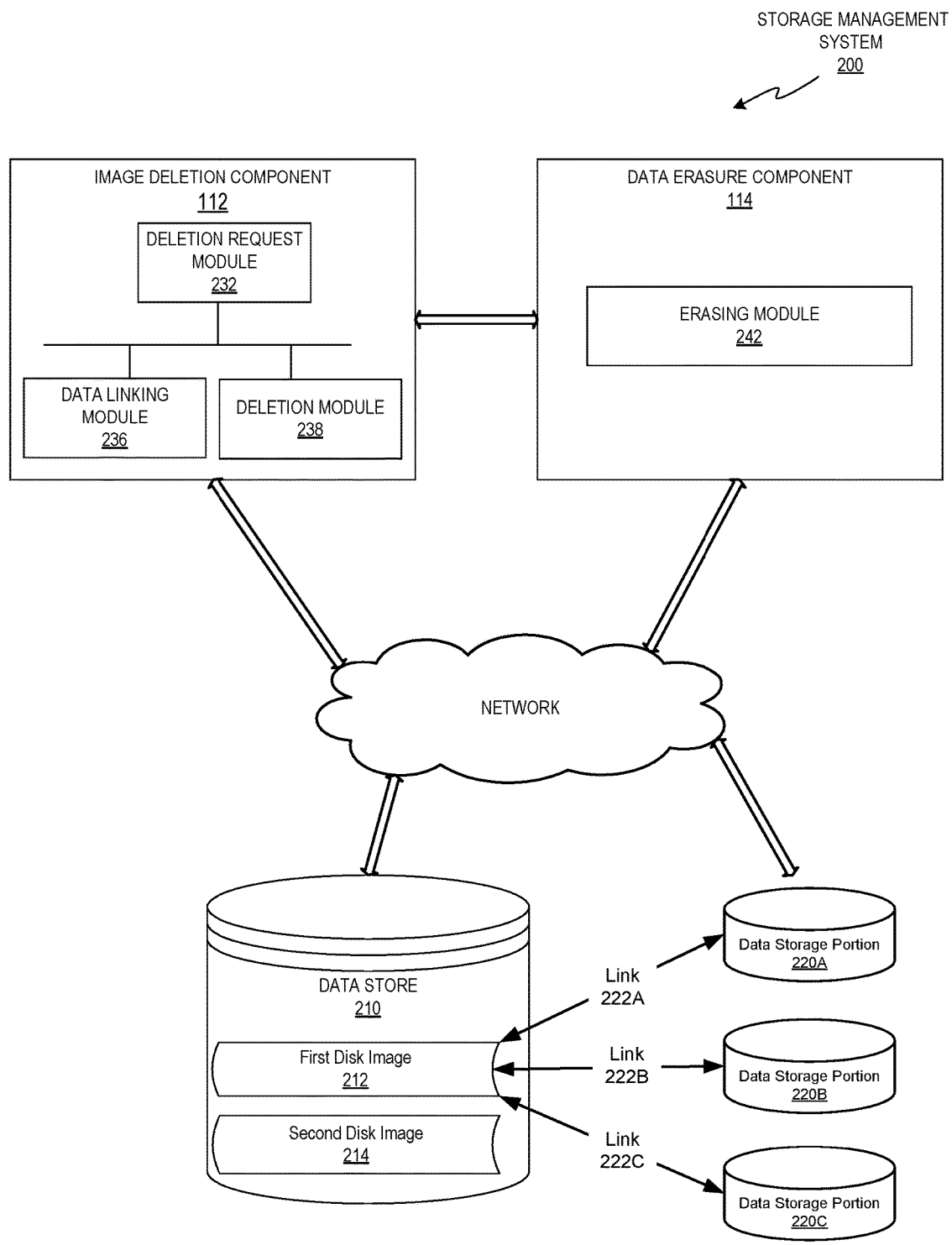
FIG. 2 schematically illustrates an example functional structure of a storage management system, in accordance with one or more aspects of the present disclosure.

FIG. 2 depicts a high-level component diagram of one illustrative example of a storage management system 200, in which systems and methods described herein may operate. Storage management system 200 may be included within a virtualization manager 110 and may also include portions within the host system (e.g., host management module) or within the shared storage domains. In one example, storage management system 200 may include a data store 210, data storage portions 220A-C, an image deletion component 112, and a data erasure component 114. The components and modules discussed below may be executed on one or more computing devices. For example, deletion request module 232 and a temporary image creation module may be executed on a first device (e.g., virtual storage management device) and data linking module 236 and erasing module 242 may be executed on a second device (e.g., a worker host selected by virtual storage management device).

Data store 210 may be any persistent or non-persistent data storage that is capable of storing one or more disk images. Data store 210 may be a part of shared storage domain and may be accessible by storage management system 200 over a network connection or without traversing a network connection (e.g., locally attached storage). Data store 210 may store a first disk image 212 and a second disk image 214 on one or more devices. For example, first disk image 212 may be stored on a first storage device and second disk image 214 may be stored on a second storage device or both disk images may be stored on multiple storage devices (e.g., data striping, data mirroring). First disk image 212 may be a disk image that has been targeted for deletion and second disk image 214 may be a temporary disk image that stores the data storage portions of the first disk image while they are being erased.

Each of the disk images 212 and 214 may store and organize information that may be loaded onto a machine (e.g., virtual machine or physical machine) and may be executed by the machine to provide a computing service. In one example, a disk image may be generated by creating a sector-by-sector copy of a source medium (e.g., hard drive of example machine). In another example, a disk image may be generated based on an existing disk image and may be manipulated before, during, or after being loaded and executed. The format of the disk images 212 and 214 may be based on any open standard, such as the ISO image format for optical disc images, or based on a proprietary format. Each disk image 212 and 214 may be associated with one or more computer programs (e.g., operating systems, applications) and configuration information (e.g., configuration files, registry keys, state information). The configuration information may include state information that indicates the state of one or more running programs at a point in time or over a duration of time.

Each state may be the same or similar to a snapshot of the machine at a particular point in time or over a duration of time. In one example, the snapshot may store the state of a machine in a manner that enables it to be portable to other computing devices, so that when the other computing devices loads the snapshot it may function as if it were running on the original device. Each disk image may be a data structure that functions as a container for a specific machine. The data structure may contain the contents and structure of one or more partitions. The content of a disk image may be contained within the data structure and may be contained outside of the data structure and linked to the data structure of the disk image. As shown in FIG. 2, first disk image 212 includes links 222A-C with data storage portions 220A-C.

Each of the links 222A-C may indicate that a particular data storage portion is associated with a particular disk image (e.g., first disk image 212). Links 222A-C may function as references or pointers and may include data that identifies or indicates the target of the link. Links 222A-C may be unidirectional links, bidirectional links, or a combination thereof. For example, a link may be stored within the data storage portion and point to the data structure of a disk image or may be stored within the data structure of a disk image and point to a data storage portion, or it may be a combination of both (e.g., bidirectional). In the example shown, link 222A may be stored within data storage portion 220A and may indicate that the respective disk image 212 is associated with data storage portion 220A.

Data storage portions 220A-C may store content related to a disk image. As shown in FIG. 2, data storage portions 220A-C may each be associated with the same particular disk image (e.g., first disk image 212). Each data storage portion 220A-C may be within one or more shared storage domains and may correspond to one particular state (e.g., snapshot) of a machine. In one example, each of the data storage portions 220A-C may be a respective volume of persistent data storage within the same shared storage domain. Each data storage portion may include data area (e.g., volume data), metadata area (e.g., volume metadata) and a lease area (e.g., volume lease). The data area may store content of the disk image, such as data of a particular snapshot. The metadata area may store information that indicates whether the volume is part of a volume chain and may indicate a child volume, a parent volume, or a combination thereof. Metadata area may store information for one or more of the links 222A-C. In one example, the metadata area of the data storage portion may be the same or similar to data for logical volume management (LVM), which may enable the allocation of space on the shared storage domain and may enable the virtualization of storage by storage management system 200.

Storage management system 200 may execute on one or more computing devices and may manage the access and use of disk images. The management of disk images may include the creation, deletion, and reuse of disk images. Storage management system 200 include image deletion component 112 and data erasure component 114 for implementing deletion and reuse of disk images in a security enhanced manner (e.g., enhances data privacy). The components and modules discussed below may execute on different devices and may involve initiating an action that occurs on another device. For example, when deleting a disk image or erasing a data storage portion, the computing device may execute a delete instruction that initiates an action by one or more other computing devices to accomplish the intended result.

Image deletion component 112 may enhance the deletion of first disk image 212 by creating a second disk image (e.g., temporary disk image) that is associated with the data storage portions of the first disk image 212. This may be advantageous because it may enable the first disk image to be deleted before, during, or after the data storage portions of the first disk image are erased. Image deletion component 112 may include a deletion request module 232, a data linking module 236, and a deletion module 238.

Deletion request module 232 may handle requests that target a disk image for deletion. A disk image may be deleted for any reason, such as to free storage space for other disk images. The request may identify one or more disk images or may include information that may be used by the deletion request module 232 to identify one or more disk images. The request may be received by the deletion request module 232 or may be generated by the deletion request module 232. In one example, deletion request module 232 may receive a request from another module on the device or from a different device over a network. In another example, deletion request module 232 may determine when a disk image should be deleted and generate the request to delete a disk image. The determination may be based on usage of a disk image, availability of storage, user input, or other information. In response to a request to delete a disk image, the deletion request module 232 may determine whether the disk image should be erased when the disk image is deleted.

Determining whether a disk image should be erased may involve evaluating one or more erasure criteria. Deletion request module 232 may analyze erasure criteria and may determine that some of the disk images should be deleted and erased and that other disk images can be deleted without being erased. The erasure criteria may be stored on the computing device that is executing image deletion component 112 or may be stored on another device over the network. The erasure criteria may include configuration information, user input, other information, or a combination thereof. The configuration information may indicate whether a particular disk image is to be erased by identifying a particular disk image or by providing information that may be used to identify a disk image. Configuration information may include settings, rules, or a combination thereof that may be evaluated to identify disk images. The configuration information may be based on security settings (e.g., privacy settings), ownership (e.g., creator, leasor), usage (e.g., functional role, information accessed), or other information. In one example, the configuration information may be evaluated to determine that when a disk image was generated, it was associated with a particular privacy setting that indicates the disk image should be erased when deleted. In another example, usage of the disk image may indicate the disk image contains confidential information or accessed confidential information while being executed. Based on the usage and an existing configuration rule, the disk image should be erased. In one example, when deletion request module 232 determines the disk image should be erased, it may invoke a temporary image creation module.

In one example, storage management system 200 may include a temporary image creation module as part of image deletion component. The temporary image creation module may generate a disk image that may function as a temporary container for data storage portions 220A-C. The Temporary image creation module may create second disk image 214 in response to determining there is a request to delete a first disk image that should be erased. The second disk image may be the same or similar to the data structure of first disk image 212 and may be capable of being associated with the same data storage portions that are currently associated with first disk image 212. In one example, second disk image 214 may be based on a default disk image data structure. In another example, second disk image 214 may be based on the disk image data structure of first disk image 212. For example, second disk image 214 may be copied or cloned from first disk image 212 and may be modified to have a different disk image identifier.

Data linking module 236 may modify second disk image 214 to associate the second disk image 214 with one or more data storage portions 220A-C, which may currently be associated with the first disk image 212. Data linking module 236 may modify both the first disk image 212 and the second disk image 214 by modifying links 222A-C. The modification of one or more of the links 222A-C may occur consecutively, in parallel, or a combination thereof. Data linking module 236 may analyze first disk image 212 to identify a first data storage portion, which may be a first volume in a volume chain. Data linking module 236 may then initiate an update or perform an update to link 222A. The update may involve transitioning link 222A from being associated with first disk image 212 to being associated with the second disk image 214. The update may involve modifying the data storage portion, the data structure of the disk image, or a combination thereof. In one example, updating link 222A may involve modifying data storage portion 220A (e.g., LVM meta data) to remove a reference (e.g., pointer) to first disk image 212 and to add a reference to second disk image 214. In another example, updating link 222A may involve modifying first disk image 212 to remove a reference to data storage portion 220A and modifying second disk image 214 to add a reference to data storage portion 220A. In either example, the process may continue (e.g., iterate) through each of the data storage portions 220A-C and the end result may be that first disk image 212 may no longer have any data storage portions associated with it and second disk image 214 may now be associated with all of the data storage portions that were previously associated with first disk image 212.

Deletion module 238 may delete first disk image 212 so that the identifier of the first disk image 212 may be subsequently reused. Deleting first disk image 212 may involve one or more steps that may be performed by one or more separate devices. A first step may involve marking first disk image 212 for deletion, which may involve setting one or more bits (e.g., deletion flags) to indicate the disk image is in the process of being deleted and that the storage occupied by the first disk image 212 will be available for reuse. The process of marking a disk image for deletion may involve marking the data structure of the disk image and iterating through one or more of the data storage portions associated with the disk image to mark them for deletion. In one example, when the disk image is marked for deletion the disk image meta data and other information associated with the disk image (e.g., volume identifiers) may be available for reuse, such as for creating another disk image or associating with another disk image. For example, this may enable an identifier of a disk image to be available for reuse after the disk image is marked for deletion. As discussed above, the disk image may no longer have any data storage portions associated with it if they have been transferred to a temporary disk image.

After the disk image has been marked for deletion, the storage occupied by the disk image may be deleted so that it is available for reuse. In one example, the deletion of the disk image may be initiated by the same computing processes that marked the disk image for deletion. In another example, the deletion of the disk image may be performed at a later time (e.g., after a failure) by a recollection process. The recollection process may be the same or similar to a garbage collector. A garbage collector may be a computing process that accesses portions of a storage domain and may reclaim storage occupied by objects (e.g., disk images) that are no longer referenced (e.g., partially deleted). The garbage collector may scan a storage domain or a portion of a storage domain to identify objects that have been marked for deletion but are still occupying storage space. In one example, storage management system 200 may use the recollection process to account for failures (e.g., deletion failures, system failures). In one example, a first computing process may attempt to delete a disk image and may fail. The recollection process may then subsequently delete the first disk image after the first computing process failed. In another example, a failure may involve a system failure and after recovering from the failure, the recollection process may run and identify objects that have been marked for deletion but have not yet been deleted. Recollection process may then delete the object or any remaining portion of the object in order to reclaim storage for reuse by another computing device or computing process.

Data erasure component 114 may initiate a data erasure procedure for a disk image before, after, or during the deletion of a disk image. The data erasure procedure may involve erasing (e.g., overwriting, clearing, wiping) data from data storage portion(s) associated with the disk image. Data erasure component 114 may be capable of ensuring that the data within a data storage space is erased even if failures occur (e.g., system failures). In one example, data erasure component 114 may include an erasing module 242 and a failure recovery module.

Erasure module 242 may erase the data associated with a deleted disk image. Erasing a disk image may involve erasing the data within the data storage space occupied by or associated with the disk image so that the data is inaccessible by a subsequent computing process or computing device that is assigned the data storage space. The procedure of erasing may be similar to the procedure of deleting because they both may free data storage space. A difference between the deletion procedure and an erasure procedure is that the erasure procedure may include a process of modifying data within the data storage space, whereas the deletion procedure may leave the data within the data storage unmodified when freeing the data storage space. Erasing data may involve overwriting data, clearing data, resetting data, or other modification of the data within a data storage space.

In one example, storage management system 200 may include a failure recovery module that may be a part of data erasure component 114. The failure recovery module may ensure that the data within a data storage portion is erased despite the occurrence of a failure. A failure may be any failure that affects the erasure procedure, such as a computer program failure, hardware failure, or combination thereof. The failure may occur on a computing device providing features of the storage management system, a computing device providing the shared storage domain, a computing device of a host accessing the object, a computing device of the network, other computing device, or combination thereof. After the computing device recovers from the failure, the failure recovery module may determine whether the data erasure procedure completed. If it did not, the failure recovery module may re-initiate the data erasure procedure and ensure the data within the data storage portions have been erased.

Figure 3:
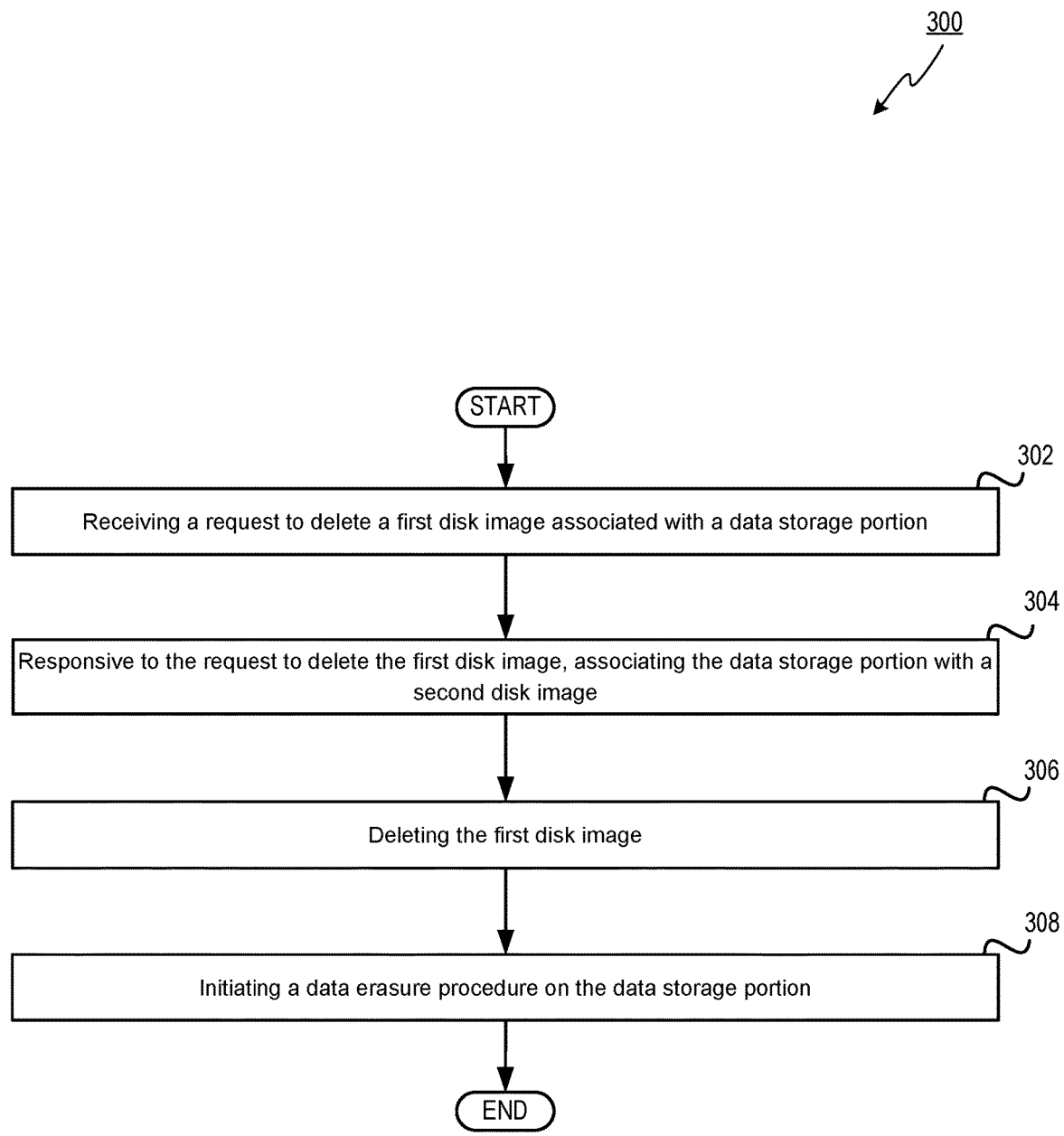
FIG. 3 depicts a flow diagram of a method for deleting a disk image and erasing data within a data storage portion of the disk image, in accordance with one or more aspects of the present disclosure.
Figure 4:
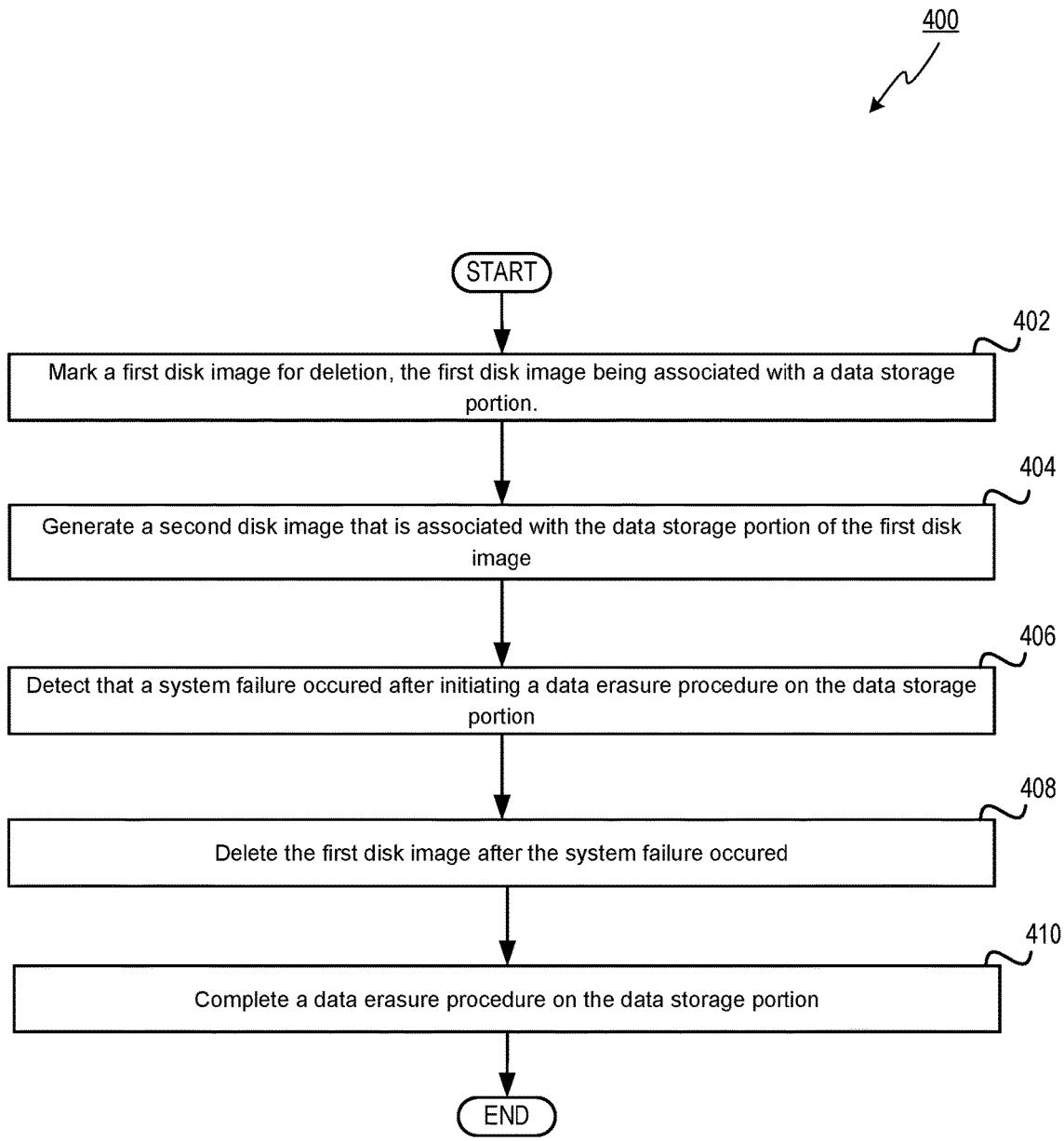
FIG. 4 depicts a flow diagram of a method for deleting a disk image and ensuring the data storage portion of the disk image is erased despite an occurrence of a system failure, in accordance with one or more aspects of the present disclosure.

FIGS. 3 and 4 depict flow diagrams for illustrative examples of methods 300 and 400 for deleting a disk image and the data storage portions associated with the disk images. Method 300 includes a method of deleting a first disk image and erasing (e.g., overwriting) the data storage portions associated with the first disk image. Method 400 may include a method similar to method 300 and may account for a failure that may arise during the deletion process and ensuring that the data storage portions are erased. Methods 300 and 400 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing devices 110A-C as shown in FIGS. 1 and 2.

Referring to FIG. 3, method 300 may be performed by processing devices of a computing device and may begin at block 302. At block 302, a processing device may receive a request to delete a first disk image associated with a data storage portion. The data storage portion may be a volume of data storage on a block-based data storage device or may be a volume of data storage on a file-based data storage device. The processing device may access configuration information in response to receiving the request to delete the first disk image. The configuration information may indicate the data storage portion of the first disk image is to be erased. In one example, the first disk image may comprise an identifier and the method may comprise reusing the identifier of the first disk image after deleting the first disk image but before performing the data erasure on the data storage portion.

At block 304, the processing device may associate the data storage portion with a second disk image in response to the request to delete the first disk image. Associating the data storage portion with the second disk image may involve generating a second disk image in response to receiving the request to delete the first disk image. The associating may further involve modifying the data storage portion to remove a reference to the first disk image and add a reference to the second disk image. Associating the data storage portion of the first disk image with the second disk image may occur without moving data of (e.g., within) the data storage portion. In one example, associating the data storage portion with the second disk image may involve updating the logical volume management (LVM) data of the data storage portion to replace data referencing the first disk image with data referencing the second disk image. LVM data may be metadata that enables the virtualization of storage by a storage management system. LVM data may be included within a metadata area of the data storage portion.

At block 306, the processing device may delete the first disk image. Deleting the first disk image may involve marking the first disk image for deletion by modifying text of an identifier of the first disk image. After marking the first disk image, the disk image may be considered deleted and the identifier of the disk image may be available for reuse and subsequently reused. The processing device may initiate the release of the storage space occupied by the disk image. The storage space occupied may be released by a storage manager (e.g., virtual management system) or by a recollection process (e.g., garbage collector) as discussed above. In one example, the first disk image may comprise a data structure and the data structure may be deleted and the space occupied by the data structure may be released so that it is available for reuse by another computing process or computing device. In another example, the first disk image may no longer be associated with the data storage portion because the data storage portion may have been associated with the second disk image (e.g., without moving data within the data storage portion). As such, the deletion of the first disk image may be performed and the data portion may still be accessible and erased using the second disk image (e.g., second disk image identifier).

At block 308, the processing device may initiate a data erasure procedure on the data storage portion. The data erasure procedure may modify the data storage portion that was previously associated with the first disk image after the data storage portion is associated with the second disk image. In one example, a data erasure procedure comprises overwriting the data storage portion with other data. The other data may comprise specific data values or a plurality of randomly generated values (e.g., pseudo-randomly generated values). In another example, the data erasure procedure may comprise clearing existing values (e.g., resetting values, flashing storage space). Responsive to completing the operations described herein above with references to block 308, the method may terminate.

Referring to FIG. 4, method 400 may be performed by processing devices of a computing device and may begin at block 402. At block 402, a processing device may mark a first disk image for deletion, and the first disk image may be associated with a data storage portion. In one example, the first disk image may be associated with a plurality of portions of data storage and each of the portions may represent the disk at a point in time. In one example, the first disk image may be a virtual disk image associated with a plurality of volumes of data storage and the volumes represent states of a virtual machine at different points in time. The multiple volumes associated with the first disk image may be arranged as a volume chain and the volume chain may comprise a first volume being linked to a second volume and the second volume being linked to a third volume without the first volume or the first disk image being directly linked to the third volume.

At block 404, the processing device may generate a second disk image and associate it with the data storage portion of the first disk image. The first disk image and the second disk image may each be a virtual disk image representing the same machine. In one example, the data storage portion of the first disk image may comprise multiple data storage portions that are each a volume of data storage. Associating the data storage portions of the first disk image with the second disk image may involve identifying the multiple volumes associated with the first disk image, which may be on different data storage devices. The association may also involve selecting one or more hosts with access to the multiple volumes and instructing the one or more hosts to associate each of the multiple volumes with the second disk image.

At block 406, the processing device may detect that a system failure occurs after initiating a data erasure procedure of the data storage portion. The system failure may be any failure, such as a computer program failure, hardware failure, or combination thereof. The failure may occur on a computing device with the processing device executing method 400 or another computing device. The failure may interrupt one or more of the steps of method 400. For example, the failure may occur after marking the disk image for deletion but before deleting the first disk image. Alternatively, the failure may occur after deleting the first disk image but before completely erasing the data storage portions that were associated with the first disk image. In either situation, the processing device may determine a data erasure procedure failed and may mount the second disk image and reinitiate the data erasure procedure. The processing device may determine a data erasure procedure failed using any detection method. In one example, the processing device may update progress information in a data store (e.g., database) that indicates the progress or status of the data erasure procedure for the data storage portions, disk images, or a combination thereof. In view of the progress information, the processing device may determine whether the data erasure procedure failed (e.g., did not complete) on any particular data storage portion or disk image. In another example, the processing device may mark the second disk image or one or more of the data storage portions in a manner similar to the marking used for deletion (e.g., setting a flag). For example, a flag may be set when the data erasure begins and may be cleared when the data erasure procedure completes. If the data erasure flag is still set after a recovery, the processing device may determine that a failure occurred.

At block 408, the processing device may delete the first disk image after the system failure occurs. The first disk image may be marked for deletion and after recovering from a failure the first disk image may be deleted by a garbage collector (e.g., recollection process). In one example, the garbage collector may delete the first disk image while the data erasure procure is occurring on the data storage portions that are now associated with the second disk image and were previously associated with the first disk image.

At block 410, the processing device may complete a data erasure procedure on the data storage portion. This may involve the processing device recovering from a failure that occurs after deleting the first disk image and subsequently determining (e.g., ensuring) that the data erasure procedure completes (e.g., checking flag). Responsive to completing the operations described herein above with references to block 410, the method may terminate.

Figure 5:
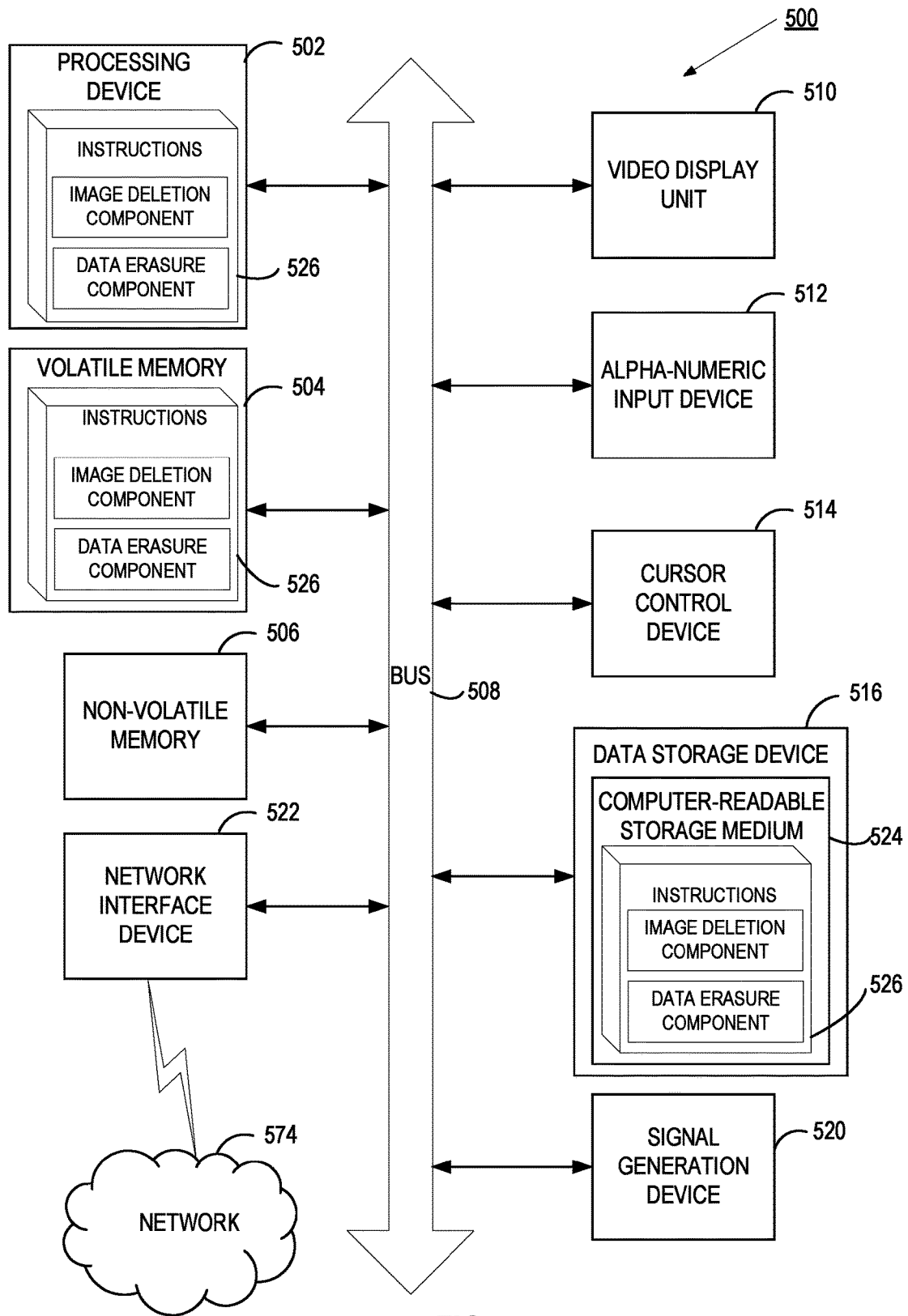
FIG. 5 depicts a block diagram of an illustrative computing device operating in accordance with the examples of the present disclosure.

FIG. 5 depicts a block diagram of a computer system operating in accordance with one or more aspects of the present disclosure. In various illustrative examples, computer system 500 may correspond to a computing device within system architecture 100 or storage management system 200 of FIG. 1 and FIG. 2 respectively. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding image deletion component 112 and data erasure component 114 of FIG. 1 for implementing methods 300 or 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving a request to delete a first disk image associated with a data storage portion;
   responsive to the request to delete the first disk image, associating, by a processing device, the data storage portion with a second disk image;
   deleting the first disk image; and
   initiating a data erasure procedure on the data storage portion.

2. The method of claim 1, wherein the first disk image comprises an identifier and the method further comprises reusing the identifier of the first disk image after deleting the first disk image and before completing the data erasure procedure on the data storage portion.

3. The method of claim 1, wherein the data erasure procedure modifies the data storage portion associated with the first disk image after the data storage portion is associated with the second disk image.

4. The method of claim 1, wherein associating the data storage portion of the first disk image with the second disk image occurs without moving data of the data storage portion.

5. The method of claim 1, wherein associating the data storage portion with the second disk image comprises:
generating a second disk image in response to receiving the request to delete the first disk image; and
modifying the data storage portion to remove a reference to the first disk image and to add a reference to the second disk image.

6. The method of claim 1, further comprising:
recovering from a failure after deleting the first disk image; and
ensuring that the data erasure procedure completes.

7. The method of claim 1, wherein deleting the first disk image comprises:
marking the first disk image for deletion; and
deleting the first disk image, by a garbage collector, after recovering from a failure.

8. The method of claim 1, wherein deleting the first disk image is completed by a garbage collector while the data erasure procedure is occurring on the data storage portion.

9. The method of claim 1 further comprising, accessing configuration information in response to receiving the request to delete the first disk image, wherein the configuration information indicates the data storage portion of the first disk image is to be erased.

10. The method of claim 1, wherein the data storage portion is a volume of data storage on a block-based data storage device.

11. The method of claim 1, wherein the first disk image and the second disk image are each a virtual disk image.

12. The method of claim 1, wherein the first disk image is associated with a plurality of volumes of data storage and each volume corresponds to state of a virtual machine at point in time.

13. The method of claim 12, wherein associating the data storage portion with a second disk image comprises:
identifying the plurality of volumes associated with the first disk image, wherein the plurality of volumes are on different data storage devices;
selecting one or more hosts with access to the plurality of volumes; and
instructing the one or more hosts to associate the plurality of volumes with the second disk image.

14. The method of claim 12, wherein the plurality of volumes associated with the first disk image are arranged as a volume chain, wherein the volume chain comprises a first volume being linked to a second volume and the second volume being linked to a third volume.

15. The method of claim 1, wherein associating the data storage portion with the second disk image comprises updating the logical volume management (LVM) data of the data storage portion to replace data referencing the first disk image with data referencing the second disk image.

16. The method of claim 1, wherein a data erasure procedure comprises overwriting the data storage portion with other data.

17. The method of claim 1, wherein deleting the first disk image comprises:
marking the first disk image for deletion by modifying text of an identifier of the first disk image; and
deleting, by a garbage collector process, the first disk image after another process failed to delete the first disk image.

18. The method of claim 1, further comprising:
determining the data erasure procedure failed;
mounting the second disk image; and
re-initiating the data erasure procedure.

19. A system comprising,
a memory; and
a processing device operatively coupled to the memory, the processing device to:
receive a request to delete a first disk image associated with a data storage portion;
associate the data storage portion with a second disk image in response to the request to delete the first disk image;
delete the first disk image; and
initiate a data erasure procedure on the data storage portion.

20. A non-transitory machine-readable storage medium storing instructions that cause a processing device to:
mark a first disk image for deletion, the first disk image being associated with a data storage portion;
generate a second disk image that is associated with the data storage portion of the first disk image;
detect that a system failure occurred after initiating a data erasure procedure on the data storage portion;
delete the first disk image after the system failure occurred; and
complete a data erasure procedure on the data storage portion.

* * * * *